United States Patent
Buchmann et al.

(10) Patent No.: US 6,339,660 B1
(45) Date of Patent: Jan. 15, 2002

(54) DEVICE AND METHOD FOR WRITING ON IMAGING MATERIAL WITH AN INTEGRATED WAVEGUIDE

(75) Inventors: Frank Buchmann, Jena; Markus Ehbrecht, Gera; Jörk Hebenstreit, Bad Klosterlausnitz, all of (DE)

(73) Assignee: AGFA-Gevaert AG, Leverkusen (DE)

( * ) Notice: Subject to any disclaimer, the term of this patent is extended or adjusted under 35 U.S.C. 154(b) by 0 days.

(21) Appl. No.: 09/398,680

(22) Filed: Sep. 20, 1999

(30) Foreign Application Priority Data

Sep. 29, 1998 (DE) .......................................... 198 44 651

(51) Int. Cl.⁷ ................................................. G02F 1/01
(52) U.S. Cl. ..................... 385/1; 385/2; 385/8; 385/40; 385/45; 359/246; 359/249
(58) Field of Search ................................ 385/1, 2, 8, 9, 385/40, 45; 359/245, 246, 249

(56) References Cited

U.S. PATENT DOCUMENTS

| | | | |
|---|---|---|---|
| 3,787,887 A | 1/1974 | Burton | 346/108 |
| 5,488,503 A | 1/1996 | Schaffner et al. | 359/245 |
| 5,802,222 A | 9/1998 | Rasch et al. | 385/1 |

FOREIGN PATENT DOCUMENTS

| | | | |
|---|---|---|---|
| DE | 43 42184 A1 | 6/1995 | H04B/10/04 |
| EP | 0 717 302 | 6/1996 | |
| WO | WO 96/25009 | 9/1996 | H04N/9/31 |

OTHER PUBLICATIONS

Japanese Patent Abstract vol. 1997, No. 01, 31. Jan. 1997 & JP 08 248365 A (Toshiba Corp).
Japanese Patent Abstract vol. 014, No. 422 (P–1104), 12. Sep. 1990 & JP 02 165117 A (Fujitsu Ltd).
Japanese Patent Abstract vol. 008, No. 109 (P–275), May 22, 1984 & JP 59 017527 A (Tokyo Shibaura Denki KK).
Dr. Jens–Peter Ruske, Ph.D. Dissertation entitled "Untersuchung der physikalischen Eigenschaften ionenausgetauschter optischer Wellenleitner und Wellenleiterbauelemente in KTP", Department for Physical, Astronomical and Technical Sciences of the Friedrich–Schiller University, Jena, 1967.

Primary Examiner—Cassandra Spyrou
Assistant Examiner—Fayez Assaf
(74) Attorney, Agent, or Firm—Darby & Darby

(57) ABSTRACT

A device and a method is proposed for writing on imaging material (3) with a radiation source (1) producing an electromagnetic radiation having a wavelength suitable for recording image information on the imaging material (3). The radiation produced by the radiation source (1) can be modulated with a waveguide which is integrated in a substrate material (49) and operates as a modulator (2). A modulation signal containing the image information can be received at an input (9) of the modulator (2). According to the invention, a compensator (6, 12) compensates a modulation error which occurs during modulation of the radiation.

38 Claims, 7 Drawing Sheets

DEVICE AND METHOD FOR WRITING ON IMAGING MATERIAL WITH AN INTEGRATED WAVEGUIDE

BACKGROUND OF THE INVENTION

1. Field of the Invention

The present invention relates to a device and a method for writing on imaging material. The device includes a radiation source for generating an electromagnetic radiation of such a wavelength that image information can be written to the imaging material using the wavelength. A waveguide is integrated with a substrate material and arranged as a modulator for modulating the radiation produced by the radiation source. The modulator includes an input capable of receiving a modulation signal which includes the image information.

2. Description of the Related Art

A device and a method of this type are described in the published international patent application WO 96/25009. This application describes a system for producing color images for rendering color or monochrome images, in particular for television and video applications and for printing, for example for printing on photo sensitive paper. The disclosed system for generating images includes waveguides which are integrated on a substrate in either monolithic or hybrid form. These integrated waveguides are implemented as modulators for modulating the intensity of the light guided in the waveguides with a modulation signal having wavelengths in the visible region of the spectrum. The modulated light exiting from the waveguide is transmitted to a device for deflecting the beam, such as a polygon mirror, which deflects the modulated lights to a photo sensitive surface—for example, photographic paper—so that the photo sensitive surface can be written line by line. They patent application also discloses that light of three wavelengths in the red, green and blue wavelength region of the visible spectrum are modulated with an integrated modulator and that the three modulated light beams are subsequently superimposed to form a color image. The disclosed image generating system therefore represents a color mixer capable of generating any desired color on the photo sensitive surface. Preferably, potassium titanyl phosphate, $KTiOPO_4$, (KTP) is used as substrate material for the color mixer. This substrate material is particular suited for guiding single-mode the radiation in the entire spectral range of the visible light.

The integrated optical waveguide disclosed in WO 96/25009 is investigated in more detail in the dissertation "Untersuchung der physikalischen Eigenschaften ionenausgetauschter optischer Wellenleiter und Wellenleiterbauelemente in KTP" by J.-P. Ruske, Department for Physical, Astronomical and Technical Sciences of the Friedrich-Schiller University, Jena. The dissertation in particular discusses advantageous and disadvantageous waveguide properties. The dissertation investigates various effects causing a change in the effective index of refraction of the modes guided in the waveguide and change in the spontaneous polarization of the substrate material. The changes in the index of refraction and polarization cause changes in the phase of the radiation guided in the waveguide. Such phase changes are caused, in particular, by thermal, photo refractive and pyroelectric effects due to the optical power of the optical radiation guided in the waveguide. The absorption of the substrate material converts the guided light energy is into heat, causing the temperature of the waveguide region to increase. This heating then causes that changes in the index and refraction and polarization mentioned above. In addition, strain is produced in the substrate material, which also affects the phase of the guided radiation through photo elastic interactions. The changes in the index of refraction caused by the photo refractive effect are directly induced by the light. The effect of the investigated parameters on the waveguide properties is dependent on the power of the guided radiation. The dissertation, however, comes to the conclusion that the changes in the refractive index and phase do not significantly affect the operation of the integrated optical waveguides.

Based on the teaching of the WO 96/25009, it is the object of the present invention to improve the rendition of image information on an imaging material.

SUMMARY OF THE INVENTION

The present invention is based on the observation that writing on imaging material with an integrated waveguide implemented as a modulator poses particularly stringent requirements. The term "imaging material" includes many different materials suitable for rendering image information. For example, imaging materials can be recording materials for permanently recording image information, such as photographic paper, photographic or thermographic film or selenium drums, and projection materials, for example for television and video applications. Imaging materials have different properties, such as a specific sensitivity with respect to the absolute energy of a radiation, which can be used to generate on the imaging material a desired representation of image information. In particular with photographic recording material, the maximum and minimum attainable density of the recording material is predetermined by the recording material itself, as well as the resolvable density steps between that minimal and maximal density. The modulated radiation for recording should therefore advantageously be matched to the respective imaging material.

With the invention, modulation errors which occur when they radiation used to write on the imaging material is modulated, can be compensated or at least significantly reduced, so that image information can advantageously be rendered on imaging material with vibrant highlights and in high resolution. Modulation errors can be caused, for example, when the substrate material heats up. Other factors, for example, an unwanted rotations of the polarization in the radiation source itself, i.e., at the time the electromagnetic radiation is generated or when the supplied radiation is guided in the modulator—e.g., in a light waveguide—can also cause modulation errors. In any event, the modulation errors reduce the quality with which the image information is rendered on the imaging material as compared to the desired rendition of the image information.

According to an advantageous embodiment of the invention, a modulation errors signal is produced and used by the compensatior for compensating the modulation error. This modulation errors signal is produced by comparing a set-point information with an image of the radiation modulated by the modulator. The so determined modulation error can advantageously be used to compensate the modulation error more accurately. The set-point information may be predetermined and selected to allow a meaningful comparison with the image of the modulated radiation corresponding to an optimized modulation. The set-point information may, for example, include image information that is to be written on the imaging material.

According to another advantageous embodiment, an image signal is supplied to the compensator, wherein the image signal contains image information and the compensator generates the modulation signal in dependence of the image signal and the modulation error signal. In this way, the modulation error signal to be used to compensate the modulation error can be combined directly in the compensator with the image information This makes the control of the modulator with a modulation signal which includes the image information to be written on the imaging material, and the control information for compensating the modulation error less complex.

According to yet another advantageous embodiment of the invention, the device includes a evaluation means for processing the spectral composition of the modulated radiation. In this way, different error causes responsible for the modulation errors, in particular modulation errors at different frequencies, can be analyzed. The spectral composition of the modulated radiation can be analyzed simply by analyzing the image of the modulated radiation. To minimize distortion and other errors which can be introduced during an analysis of the spectral composition of modulated radiation, the evaluation means can advantageously be integrated directly in the modulator in the substrate material.

Advantageously, the information about the spectral composition of the modulated radiation is used to generate the modulation error signal. In this way, all or only a limited number of error causes responsible for producing the modulation error can be selectively incorporated directly into the modulation errors signal, so that these error causes can be compensated by properly correcting the error via control of the modulator.

It yet another advantageous embodiment of the invention, the compensator includes a temperature stabilizor acting on the modulator and stabilizing its temperature. In this way, modulation errors caused by heating of the modulator can be reduced or compensated entirely. With the temperature stabilizer, the temperature of the modulator is adjusted to a value which optimizes the desired operation. The temperature stabilizer may, for example, advantageously be controlled with a suitable signal which defines the stabilization temperature for the modulator. The stabilization temperature can be more accurately determined by analyzing the low-frequency components of the modulated radiation which were determined when the spectral composition was analyzed. The upper frequency limit of the low-frequency components depends on the heat diffusion velocity of the substrate material in which the modulator is integrated. This advantageous embodiment is based on the observation that temperature effects affecting the modulator in particular cause modulation errors which can be deduced from the low-frequency components of the modulated radiation. Such temperature related modulation errors may be caused by temperature drift having a duration in the range of seconds.

In order to compensate modulation errors caused by such temperature effects with high accuracy, a sensor can be provided for determining the temperature of the modulator. The so determined temperature of the modulator can be used to produce the control signal for controlling the temperature stabilizer. In this way, the temperature of the modulator required for proper modulation can be adjusted more precisely. Alternatively or in addition, the temperature determined with the sensor can also be used to generate the modulation error signal. Modulation errors caused by temperature errors can thereby be compensated directly by controlling the modulator with the modulation signal.

In yet another advantageous embodiment of the invention, an image of the unmodulated radiation is captured. A second capture means for capturing this image can be arranged, for example, before the modulator, so that the image of the radiation is captured before the radiation produced by the radiation source is modulated in the modulator by the modulation signal. Alternatively, the second capture means may also be located after the modulator so that the image of the un-modulated radiation is captured when the modulator is not in operation, , when the radiation produced by the radiation source passes through the modulator without being modulated. The modulator is here in a passive state. Advantageously, the image of the unmodulated radiation can also be captured by the first capture means arranged after the modulator, which radiation is otherwise used to capture an image of the modulated radiation. To minimize the technical complexity for capturing the images of the radiation, it is also possible to capture the modulated radiation, when the modulator is operating, and the un-modulated radiation when the modulator is passive, using a single capture means. The captured image of the un-modulated radiation can be used to determine unwanted properties of the radiation which can cause modulation errors during modulation in the modulator, before the radiation is modulated with the modulation signal.

The captured image of the un-modulated radiation can then be supplied to the compensator for adjusting the radiation before the radiation is passed on to the modulator to modulate the radiation with the modulation signal. In this way, the radiation can be modified before the actual modulation process to eliminate modulation errors during the modulation. Alternatively or in addition, the image of the un-modulated radiation supplied to the compensator can be used to generate the modulation signal by directly controlling the modulator with a suitable modulation signal in order to compensate or at least reduce the modulation errors. Advantageously, the polarization of the radiation can be adjusted with a polarizer before the radiation is supplied to the modulator for modulation. This approach is particularly advantageous if the polarization direction of the radiation supplied to modulator does not correspond to the polarization direction to which the modulator is adjusted. In this way, the greatest possible modulation depth between a maximum in the intensity and total extinction of the modulated radiation can be attained.

Additional advantageous embodiment of the invention are recited in the dependent claims.

The invention and its advantages will be described hereinafter with reference to specific embodiments.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference numerals delineate similar elements throughout the several views.

DETAILED DESCRIPTION OF THE PRESENTLY PREFERRED EMBODIMENTS

Figure 1:
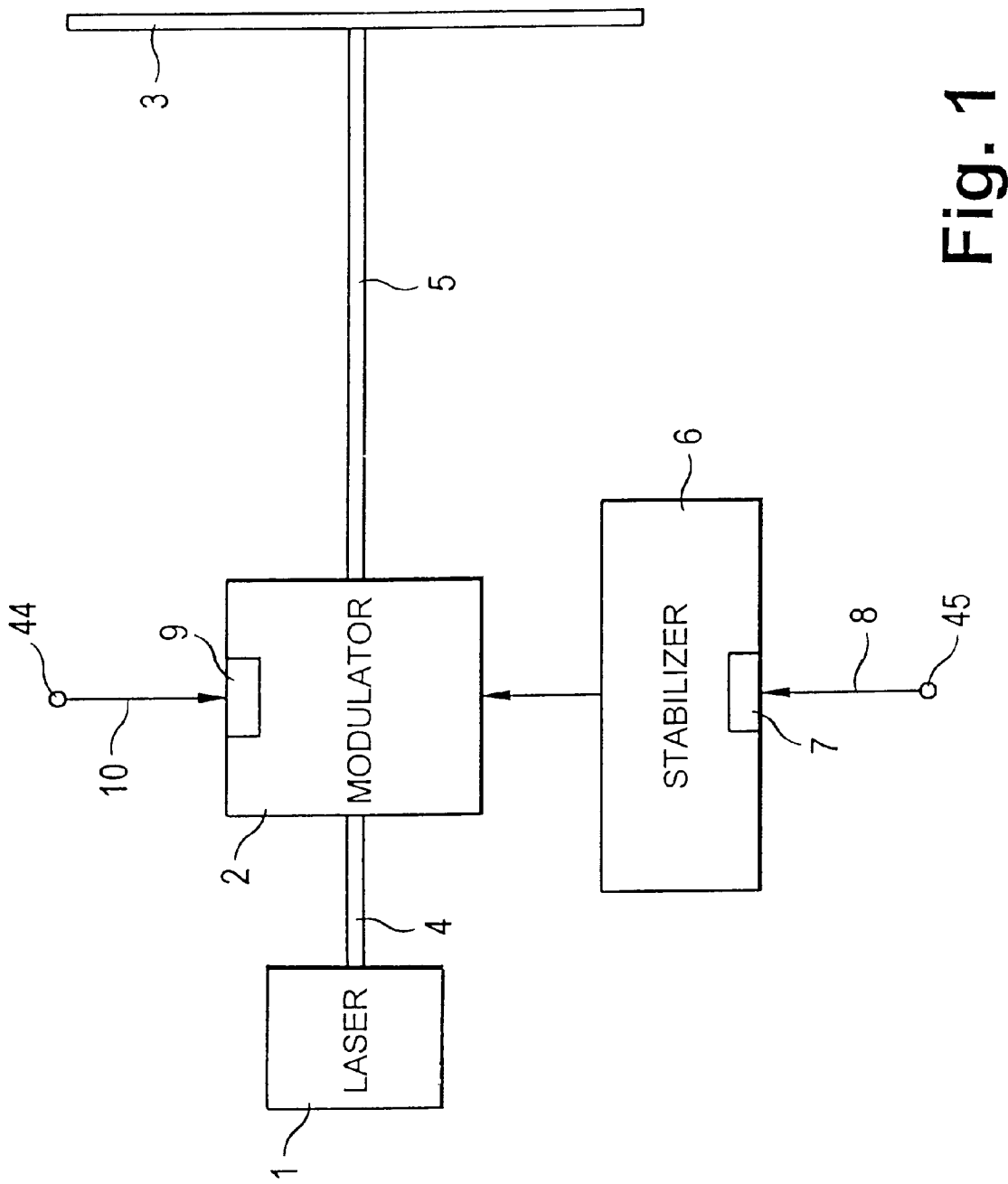
FIG 1 shows a first embodiment of the device according to the invention with a temperature stabilizer.

In the following, the same reference numerals are used for identical elements or elements performing an identical function.

FIG. 1 shows a first embodiment of a device according to the invention for writing imaging material which, in the present example, is a photographic recording material. The device according to the invention is particularly suited for a digital photo printer printing photographs on photographic paper. The photographic paper is the photographic recording material. It is also possible to use the device of the invention for exposing photographic film, for example for medical applications. In this case, for example, image information can be written on an x-ray film.

FIG. 1 shows a recording device for recording on photographic paper 3. The recording device includes a laser 1 as a radiation source for generating a laser radiation having a wavelength in the visible portion of the spectrum. The sensitivity of the photographic paper 3 and the wavelength of the laser 1 have to be suitably matched so that the laser radiation can introduce chemical reactions in the photographic paper 3 for rendering the image information on the photographic paper 3. Depending on the type and sensitivity of the imaging material used for recording, it would also be possible to use a laser source or a different radiation source which generates radiation in the infrared region of the spectrum. To simplify the discussion, it will be assumed that the laser 1 of the recording device emits single-mode radiation having a maximal intensity in the visible portion of the spectrum. To produce color images of the photographic paper 3, three different radiation components with wavelengths in the red, green and blue portion of the spectrum have to be superimposed. To simplify the illustration of the invention, the following embodiments will be described without showing the superposition of several light beams.

The recording device according to the invention includes a modulator 2 which is positioned between the laser 1 and the photographic paper 3. In the present example, the modulator 2 is a waveguide integrated in a substrate material based on potassium titanyl phosphate, KTP, which is known from the patent application WO 96/25009. The modulator 2 can modulate with a modulation signal the radiation emitted by the laser 1. This modulation signal is introduced at an input 44 of the recording device and supplied to the modulator 2 at an input 9 via a modulation signal connection 10 between the input 44 and the input 9. The modulation signal contains the image information to be rendered on the photographic paper 3. The exemplary modulation signal is in this case an analog signal. Laser radiation 4 emitted by the laser 1 is thus transmitted to the modulator 2 without being modulated, whereas the laser radiation 4 is modulated in the modulator 2 by the modulation signal. The modulated laser radiation 5 is outputted at an output of the modulator 2 and directed on the photographic paper 3.

To render the entire image information on the photographic paper 3, the photographic paper 3 and the modulated laser beam 5 have to move relative to each other. An arrangement for deflecting the beam, which has been omitted in FIG. 1 and the subsequent Figures for sake of simplicity, must therefore be provided between the modulator 2 and photographic paper 3. Such an arrangement for deflecting the beam can be, for example, a polygon mirror of the type described in the international patent application WO 96/25009. The modulated laser beam 5 may also be guided from the modulator 2 to the photographic paper 3 in a light waveguide which can move relatively between the light waveguide and the photographic paper 3 to write the image information on the photographic paper 3.

The recording device of the invention according to FIG. 1 further includes a compensator 6 in form of a temperature stabilizer. The temperature stabilizer 6 may be, for example, a Peltier element. The temperature stabilizer 6 acts on the modulator 2 and stabilizes the operating temperature of the modulator 2. The temperature may vary during operation of the modulator 2, which can cause modulation errors distorting the rendition of the image information on the photographic paper 3. In order to eliminate or at least reduce such modulation errors, the temperature stabilizer 6 stabilizes the operating temperature of the modulator 2 and adjusts the operating temperature to a value which is optimal for the modulation. The temperature stabilizer 6 has an input 7 for receiving a control signal to preset a temperature at which the modulator 2 is to be stabilized. The control signal is inputted in the recording device at an input 45 and supplied to the input 7 of the temperature stabilizer 6 via a control signal connection 8.

Figure 2:
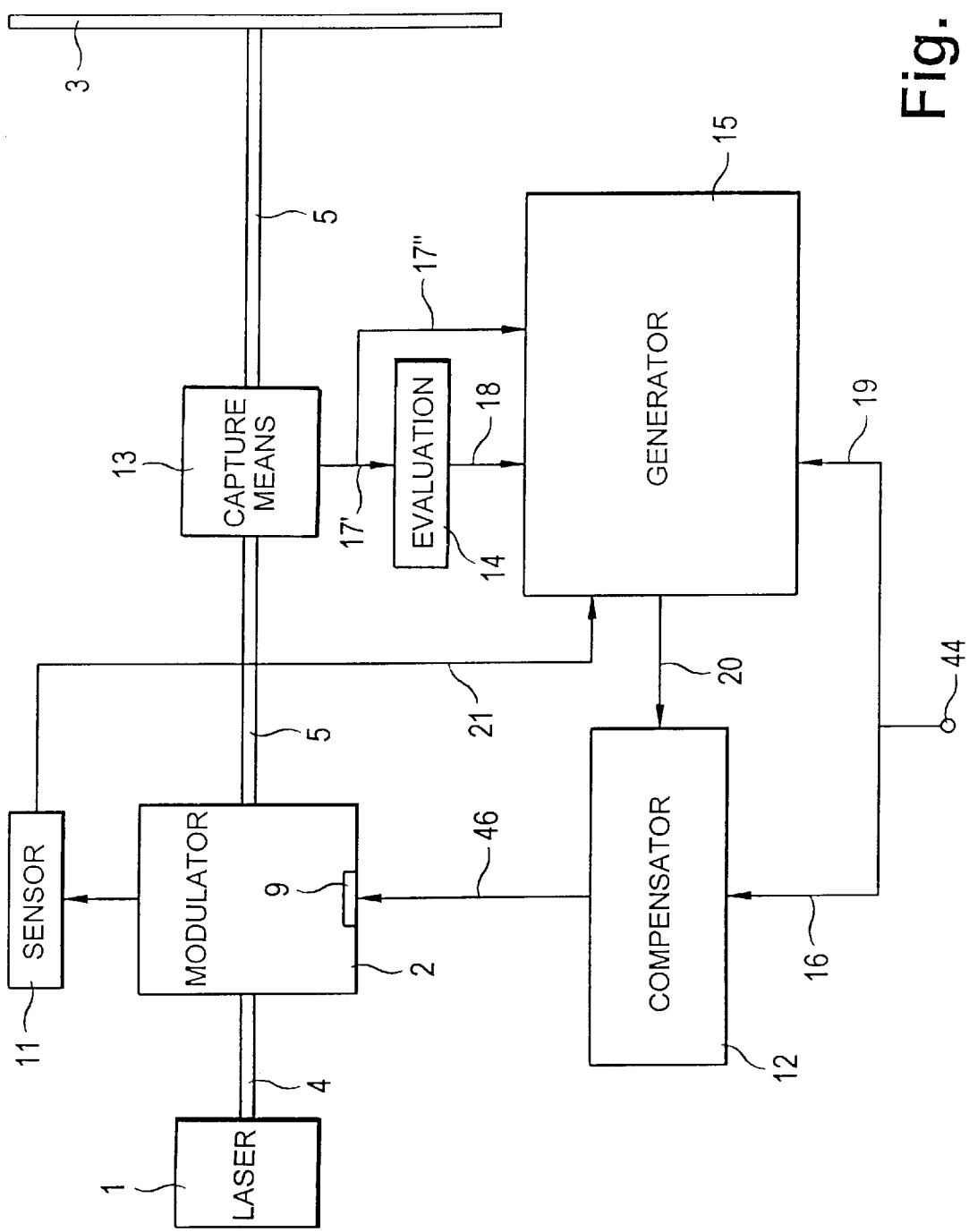
FIG. 2 shows a second embodiment incorporating evaluation and control of modulated radiation.

FIG. 2 describes a second embodiment of the device according to the invention for evaluating and controlling the modulated radiation. The recording device of the invention according to FIG. 2 includes, aside from the laser 1, the modulator 2 and photographic paper 3, also a capture means 13 positioned in the beam path of the modulated radiation between the modulator 2 and photographic paper 3. The capture means 13 can capture and image the radiation 5 modulated by the modulator 2. The capture means 13 can be provided, for example, with a photo detector which generates an electric signal according to the modulated radiation 5. The capture means 13 can also include a beam splitter for capturing an image of the modulated radiation, wherein the beam splitter diverts a small portion of the modulated radiation from the normal beam path used to write on the photographic paper 3. Such a small portion of the modulated radiation can also be extracted with a mirror or a prism. These means for extracting a portion of the modulated radiation can be integrated directly in substrate material of the integrated modulator. Alternatively, a so-called Y-coupler, for example of the type described in the patent application WO 96/25009, may be integrated in the substrate material to extract the small portion of the modulated radiation. The capture means 13 can be coupled directly to the substrate material by way of an optical light waveguide to improve the capture and guiding of the extracted image of the modulated radiation.

The image of the modulated radiation 5 captured by the capture means 13 is subsequently supplied to a evaluation means 14 for determining the spectral composition of the modulated radiation 5. The evaluation means 14 is connected with the capture means 13 by a connection 17' which transmits a signal with the captured image of the modulated radiation 5. The evaluation means 14 is also connected with a generator 15 by a connection 18 which can be used to transmit to the generator 15 an information signal containing information about the spectral composition of the modulated radiation 5.

The capture means 13 is also connected to the generator 15 via a connection 17" which can be used to transmit to the generator the image of the modulated radiation 5.

The generator 15 is connected to the input 44 of the recording device via a connection 19. The input 44 receives an image signal containing the image information to be written by the recording device on the photographic paper 3.

The recording device according to FIG. 2 further includes a temperature sensor 11 which is operatively connected to the modulator 2 and adapted to measure the operating temperature of the modulator. The temperature sensor 11 is connected to the generator 15 via a connection 21 and provides information about the current operating temperature of the modulator 2 to the generator 15.

Based on the information about the captured image of the modulated radiation 5, its spectral composition, the current operating temperature of the modulator 2, and the image information, the generator 15 can now determine the modulation error which has an unwanted effect on the modulation of the laser beam in the modulator 2. To determine the modulation error, the image of the modulated laser beam 5 supplied via the connection 17" is compared with the image information supplied via the connection 19. In this case, this image information represents a set-point information. The result of this comparison can indicate the modulation error with a certain degree of precision. The modulation error may be determined with greater accuracy by taking into consideration the temperature determined by the temperature sensor 11. As mentioned above, variations in the operating temperature of the modulator 2 cause modulation errors. If the operating temperature determined by the temperature sensor 11 deviates from a predetermined optimal operating temperature of the modulator, then the actual modulation may be somewhat distorted. By considering the current operating temperature of the modulator 2 when the modulation error is determined, the modulation error can be compensated more accurately or reduced. Variations in the operating temperature of the modulator 2 can also be determined by analyzing the spectral composition of the modulated laser beam 5. In particular, the low-frequency components of the modulated radiation indicate modulation errors caused by unwanted temperature effects affecting the modulator. The region of the spectral in which these low-frequency components of the modulated radiation occur, depends on the substrate material in which the modulator 2 is implemented. The upper frequency limit of the low-frequency region depends on the heat diffusion velocity of the substrate material. The low-frequency components contributing to the modulation error can therefore be used to better determine the modulation error and to more precisely compensate or reduce the modulation error. The generation means 15 therefore generates a modulation error signal indicative of the modulation error, wherein the modulation error signal is supplied to the compensator 12 via a connection 20 linking the generator 15 with the compensator 12.

A connection 16 for supplying the image signal with the image information to the compensator 12 is provided between the compensator 12 and the input 44 for inputting the image signals. The compensator 12 generates the modulation signal for modulating in the modulator 2 the laser radiation 4 generated by the laser 1. The compensator 12 is connected to the input 9 of the modulator 2 via a connection 46. The image signal with the image information is suitably superimposed with the modulation error signal in the compensator 12. The two superimposed signals can be suitably matched and weighted.

The modulated radiation has to be processed and controlled in "real-time." In other words, the control has to respond essentially within the time required to write a point on the photographic paper 3.

Figure 3:
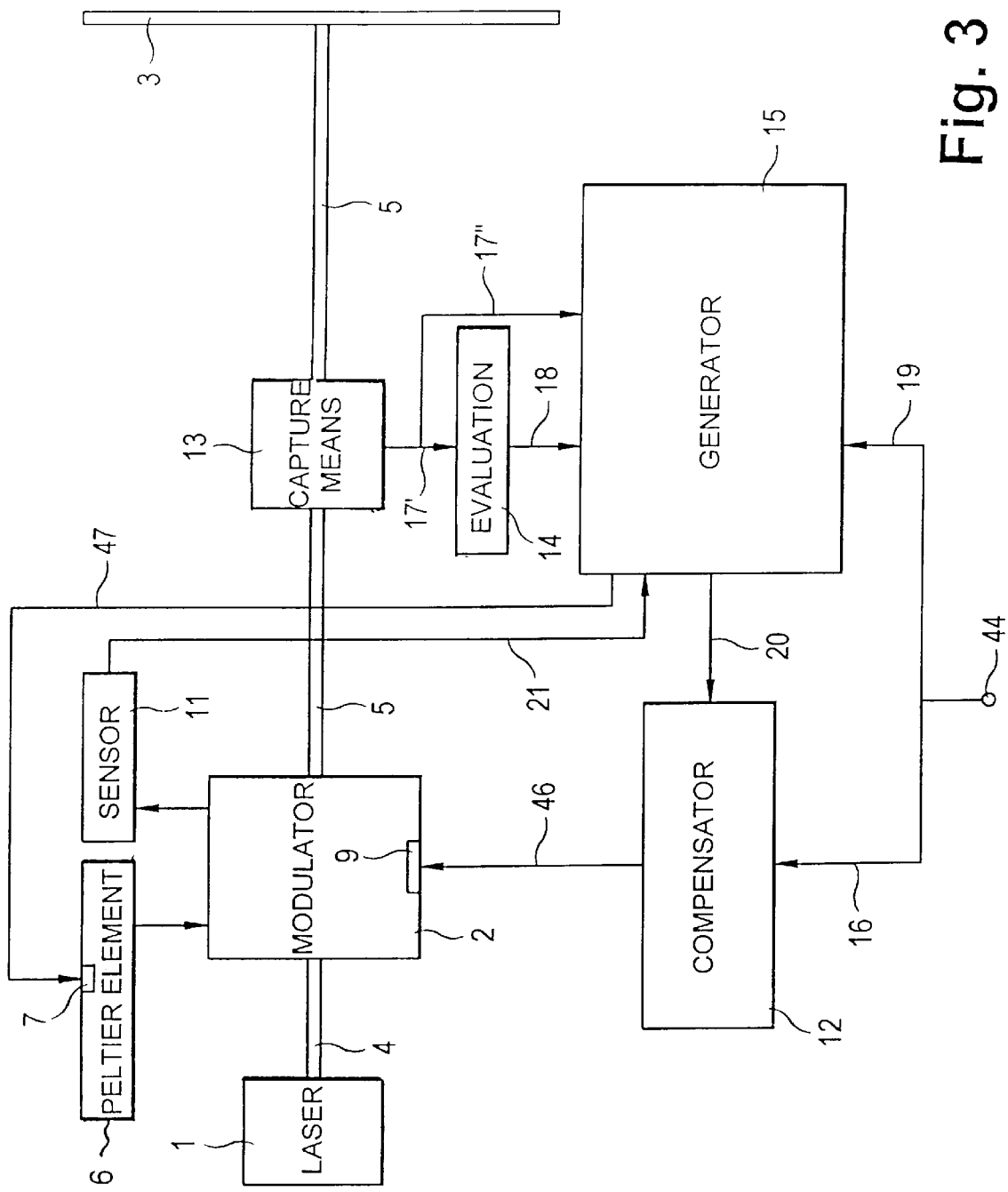
FIG. 3 shows a third embodiment incorporating evaluation and control of the modulated radiation andn additional temperature stabilization.

FIG. 3 shows the third embodiment of the recording device according to the invention for writing on photographic paper 3. The recording device of FIG. 3 includes, in addition to the recording device described with reference to FIG. 2, the temperature stabilizer 6 which has already been described above in connection with the inventive recording device according to FIG. 1. The temperature stabilizer 6 is operatively connected to the modulator 2 for adjusting the operating temperature of the modulator. The input 7 of the temperature stabilizer 6 is connected with the generator 15 via a connection 47. The temperature stabilizer 6 can receive at the input 7 via the connection 47 the control signal for setting a temperature to which the modulator should be set during operation. The control signal is generated in the generator 15 depending on the temperature measured by the temperature sensor 11 on the modulator 2. The temperature to which the temperature stabilizer 6 has to adjust the modulator 2, and the control signal produced in the generator 15 can be determined more accurately by using, in addition to the temperature determined by the temperature sensor 11, information about the low-frequency components of the modulated laser beam 5. The low-frequency components are determined by the evaluation means 14 and indicate modulation errors which are primarily caused by temperature effects affecting the modulator 2.

The recording device according to FIG. 3 therefore includes two means for compensating modulation errors. Such compensation is handled, on one hand, by the temperature stabilizer 6 and, on the other hand, by suitably generating the modulation signals for modulating the laser radiation 4. As described above, a suitable modulation signal can be generated in the compensator 12 from a respective combination of the image signals and the modulation error signal.

Figure 4:
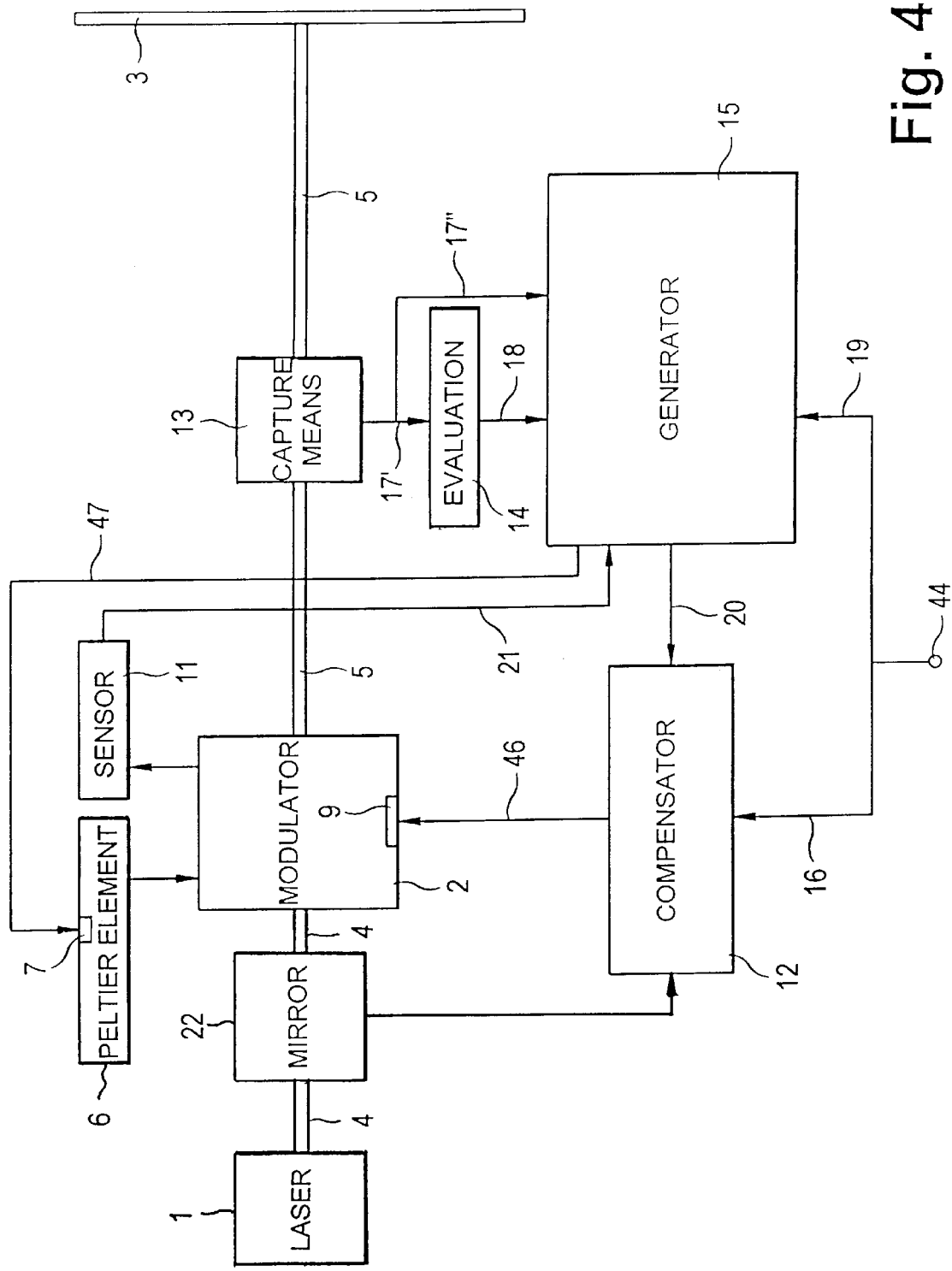
FIG. 4 shows fourth embodiment incorporating evaluation of the un-modulated radiation.

FIG. 4 shows the fourth embodiment of the recording device according to the invention, wherein, in addition, the un-modulated radiation 4 is evaluated and used to compensate the modulation error. The inventive recording device according to FIG. 4 includes, in addition to the components of the recording device described above with reference to FIG. 3, an additional capture means 22 positioned in the beam path of the un-modulated laser radiation between the laser 1 and the modulator 2. The additional capture means 22 is capable of capturing an image of the un-modulated laser radiation 4. The additional capture means 22 can be constructed in the same way as the capture means 13 for capturing an image of the modulated laser radiation 4, as described above with reference to FIG. 2. The additional capture means 22 is connected to the compensator 12 via a connection 23. The captured image of the un-modulated radiation 4 can be transmitted from the additional capture means 22 to the compensator 12 via the connection 23. The image of the un-modulated radiation is processed in the compensator 12 and evaluated. In this way, properties of the un-modulated radiation 4 can be determined which may prevent an optimal modulation with the modulator 2 or which may otherwise cause modulation errors during modulation of the un-modulated laser addition 4. These unwanted properties of the un-modulated radiation are therefore determined in the compensator 12 and can then be properly taken into consideration for generating the modulation signal. In this embodiment, the modulation signal supplied from the compensator 12 to the modulator 2 via the connection 46 is generated in dependence of the image signal, the modulation error signal and the image of the un-modulated radiation 4. The un-modulated radiation 4 is modulated in the modulator 2 in such a way that the afore-determined properties of the un-modulated radiation 4 do not contribute substantially to modulation errors.

Figure 5:
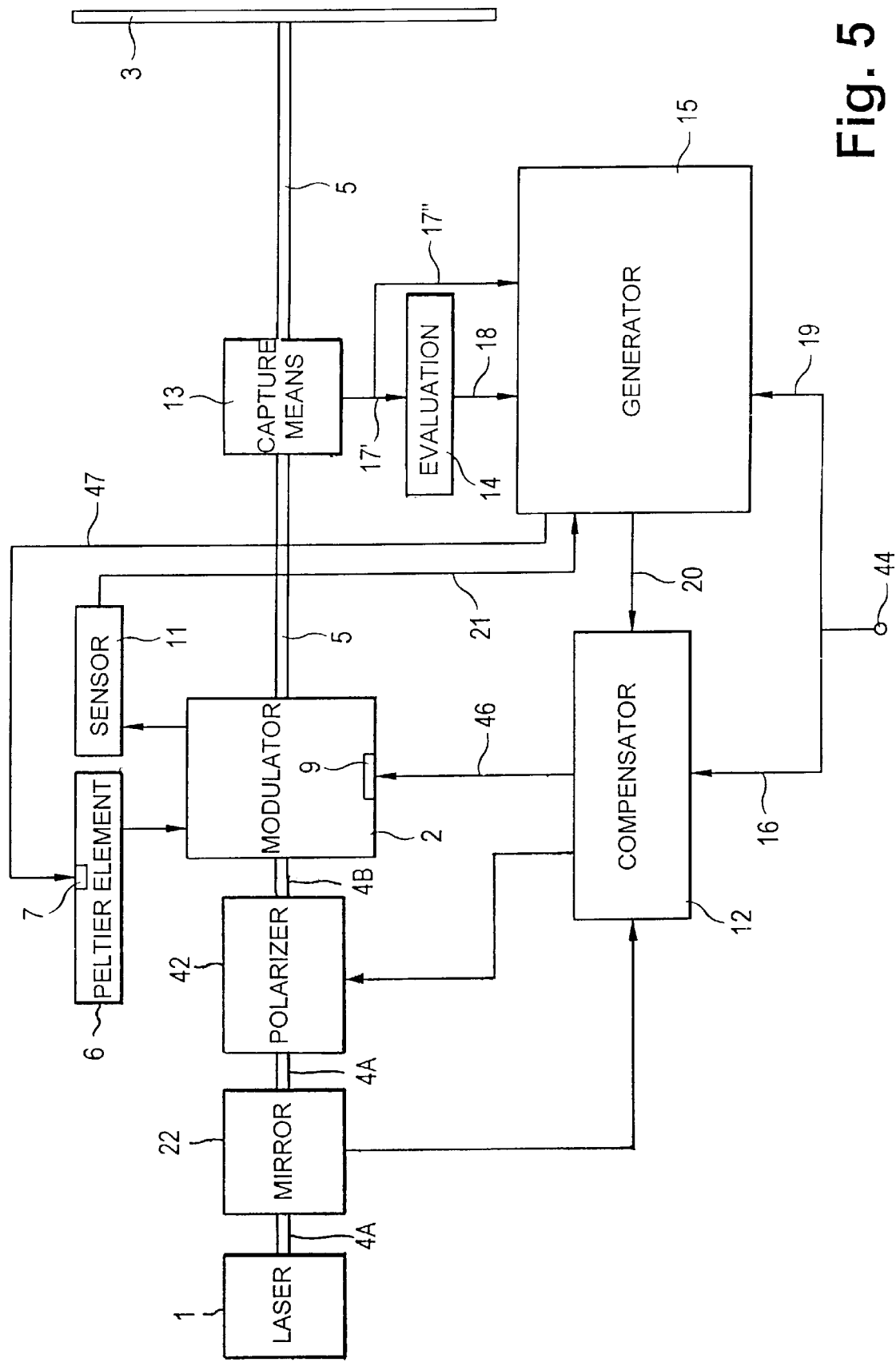
FIG. 5 shows a fifth embodiment of with a polarizer for adjusting the polarization of the radiation to be modulated.

FIG. 5 shows a fifth embodiment of the device according to the invention for writing on photographic paper 3. The inventive recording device includes, in addition to the components of the recording device described with reference to FIG. 4, a changing means 42 for changing the properties of the un-modulated radiation. The changing means 42 in the present embodiment of FIG. 5 is a polarizer for adjusting the polarization of the laser radiation to be supplied to the modulator 2. In other words, the polarizer 42 can be used to change the direction of polarization of an un-polarized radiation 4A emitted by the laser 1. The polarizer 42 is positioned in the beam path of the un-modulated radiation 4A between the additional capture means 22 and the modulator 2.

As described above with reference to FIG. 4, the additional capture means 22 captures an image of the un-modulated radiation 4A and transmits the image to the compensator 12 via the connection 23. The captured image is evaluated in the compensator 12 according to pre-determined criteria indicating unwanted properties of the laser radiation that is to be modulated. In the present fifth embodiment, the image of the un-modulated laser radiation is checked in particular with respect to the polarization direction of the un-modulated radiation 4A. The modulator 2 is optimized for certain polarization directions of the radiation which can thereby be optimally modulated. If the polarization direction of the un-modulated radiation 4A determined in the compensator 12 during evaluation of the image of the un-modulated radiation 4A is different from the modulation direction for which the modulator 2 is optimized, then a corresponding signal is transmitted by the compensator 12 to the polarizer 42. The compensator 12 is connected with the polarizer 42 via a connection 43. The polarizer 42 receives via the connection 43 a control signal which may include a preset value, indicating a possible change in the polarization direction of the un-modulated radiation 4A. An output of the polarizer 42 then outputs un-modulated radiation 4B with an altered polarization direction which is then supplied to the modulator 2.

Not only the polarization of the un-modulated laser radiation 4A, but also other properties of the laser radiation can be varied before the laser beam is modulated. For example, the intensity of the un-modulated radiation can be adjusted by arranging a controllable amplifier between the capture means 22 and the modulator 2.

Figure 6:
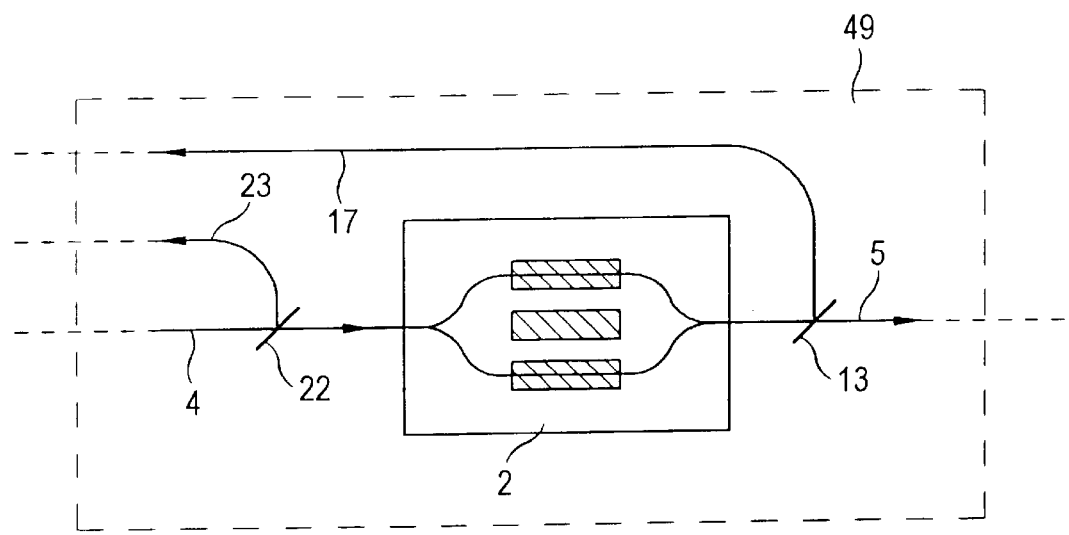
FIG. 6 shows an embodiment of a modulator according to the invention implemented as a Mach-Zehnder interferometer having two extraction means for extracting the modulated and the un-modulated radiation.

FIG. 6 shows an embodiment of a modulator 2 implemented as a single-color modulator for modulating a single radiation component or color. The modulator 2 of FIG. 6 is a so-called Mach-Zehnder interferometer of the type described in the international patent application WO 96/25009. The modulator 2 is integrated in a substrate material 49 which includes as a base material potassium titanyl phosphate, KTP. The capture means 22 and 13, respectively, are arranged before and after the modulator 2. The two capture means 22 and 13 are here implemented as semi-transparent mirrors which extract from the substrate material 40 a portion of the un-modulated laser beam 4 via the connection 23 and a portion of the modulated laser beam 5 via a connection 17. The two semi-transparent mirrors 22 and 13 are also integrated in substrate material 49, which provides a particularly compact arrangement. Extraction and guiding losses of the laser radiation are also small.

Figure 7:
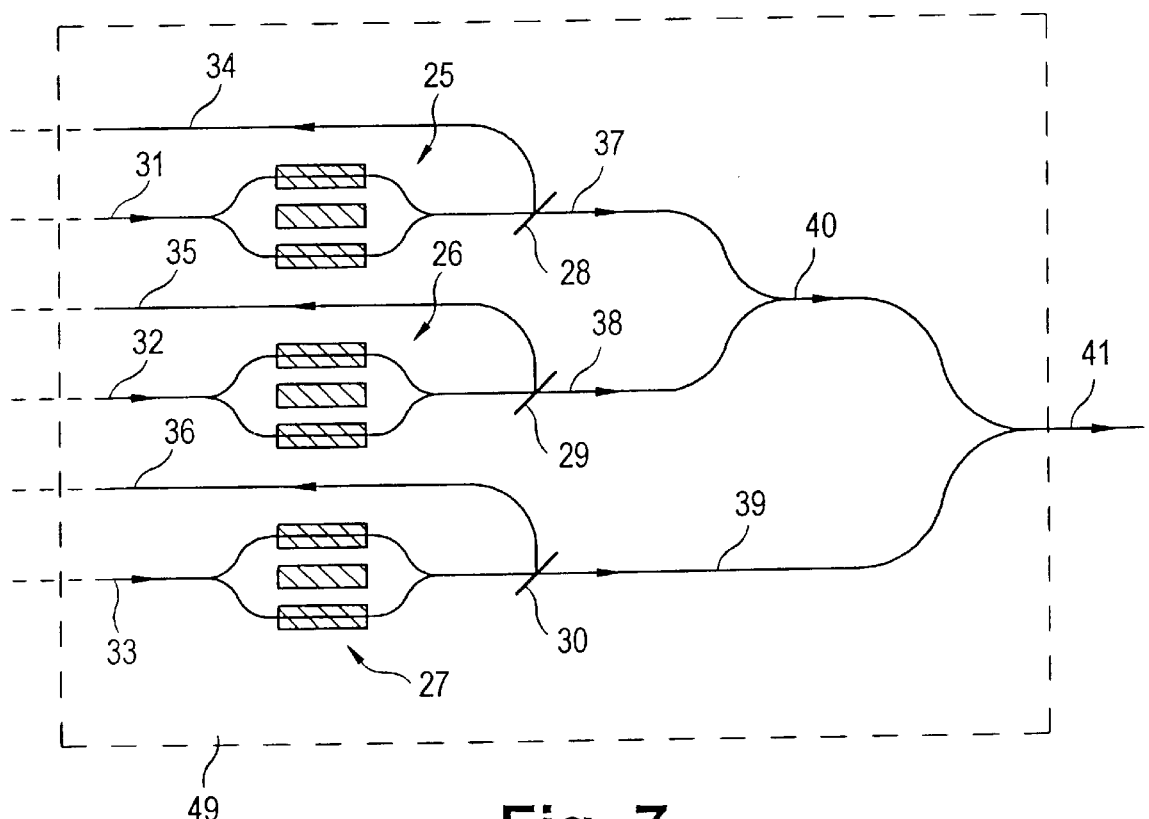
FIG. 7 shows an embodiment of a three-color mixer with three extraction means for extracting the modulated radiation components in the three colors.

FIG. 7 shows an embodiment of a three-color mixer 24 for superimposing and mixing of three radiation components from the red, green and blue region of the spectrum. The basic principle of such three color mixer is also known from the patent application WO 96/25009. The mixer includes three Mach-Zehnder interferometers, wherein the first interferometer 25 modulates the red laser radiation to be coupled in via the waveguide 31, the second interferometer 26 modulates the green laser radiation to be coupled in via the waveguide 32, and the third interferometer 27 modulates the blue laser radiation to be coupled in via the waveguide 33. A it semi-transparent mirror 28 is positioned at the output of the first interferometer 25 to extract a portion of the modulated red laser radiation via a connection 34. Likewise, semi-transparent mirrors 29 and 30, respectively, are disposed at the respective outputs of the second and third interferometer 26 and 27 to extract a portion of the green laser radiation via a connection 35 and a portion of the blue laser radiation via a connection 36, respectively. The modulated red laser radiation which passes through the mirror 28 is superimposed via a connection (waveguide) 37 with the green laser radiation which passes through the member 29 and is guided by a connection 38. The superimposed red-green laser radiation can now be superimposed via a connection 40 with the blue laser radiation which passes through the mirror 30. The modulated laser radiation in the three superimposed colors is guided onward via a connection 41. The components of the three Mach-Zehnder interferometers 25, 26 and 27 as well as the three semi-transparent mirrors 28, 29 and 30 are integrated in the substrate material 49 together with the various connections (waveguides).

In the three-color mixer 24 shown in FIG. 7, the three additional semi-transparent mirrors which may be positioned before the three Mach-Zehnder interferometers 25, 26 and 27 as capture means for capturing images of the un-modulated red, green and blue laser radiation, have been omitted from FIG. 7 for sake of simplicity.

Figure 8:
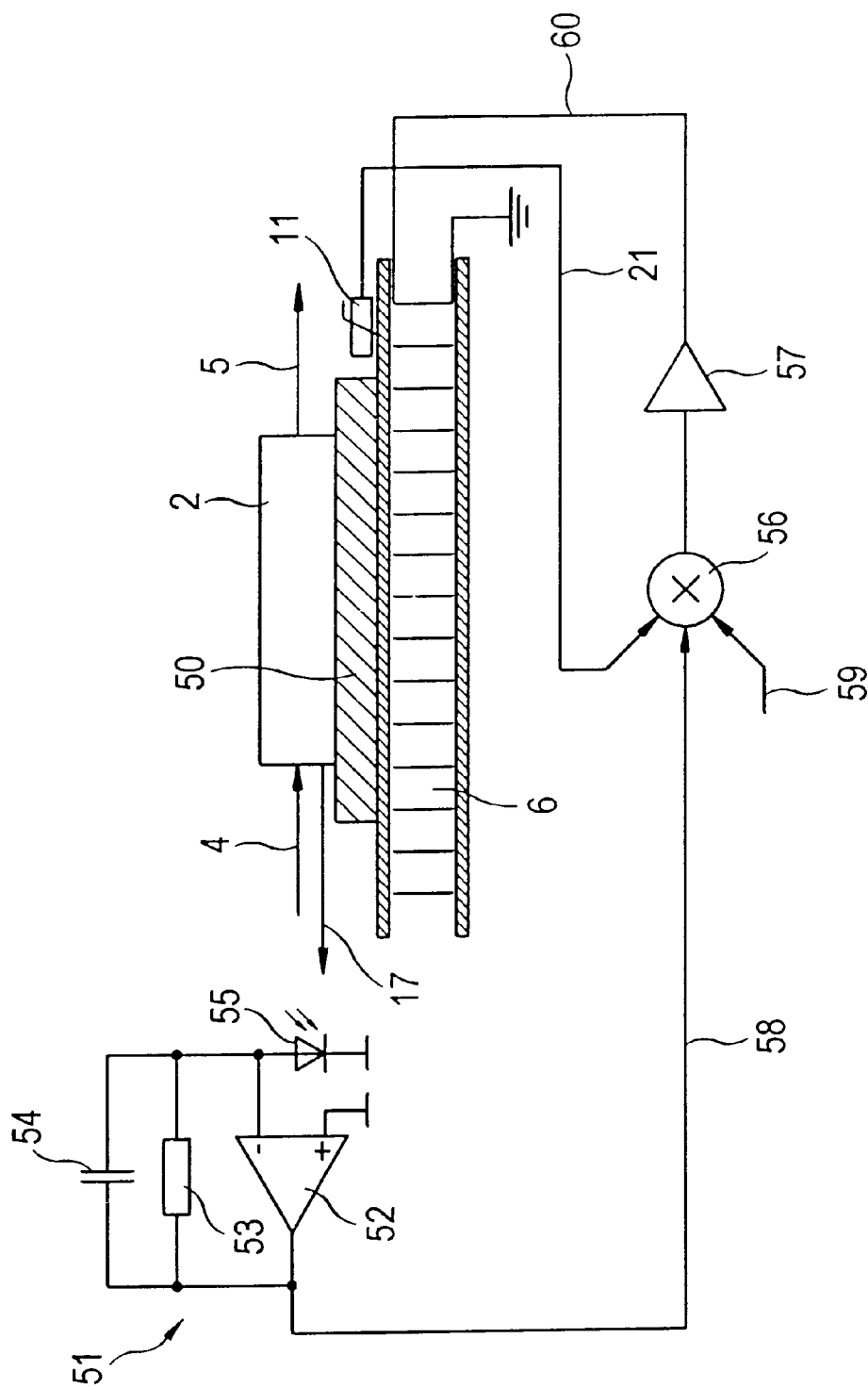
FIG. 8 shows a sixth embodiment of the device according to the invention with a temperature stabilizer.

FIG. 8 shows a sixth embodiment of the recording device of the invention with a temperature stabilizer 6. The temperature stabilizer 6 is implemented as a Peltier element and coupled to the modulator 2 via a copper plate 50 which distributes the heat flow. With this arrangement, the temperature generated by the Peltier element 6 can be transferred to the modulator 2 easily and effectively. The temperature sensor 11 which senses the operating temperature of the modulator 2, is arranged proximate to the modulator. The temperature sensor 11 is connected to a controller stage 56 via the connection 21. In this way, information about the temperature measured by the temperature sensor 11 can be transmitted to the controller stage 56.

In addition, FIG. 8 shows the connection 17 which is provided to transmit to a photo diode 55 the captured image of the laser radiation 5 modulated by the modulator 2. The photo diode 55 converts the optical image of the modulated laser radiation 5 into an electric signal. The electric signal of the modulated laser radiation is subsequently integrated in a drift integrator 51 which is provided as a evaluator for determining the spectral composition of the modulated laser radiation. The drift integrator 51 includes an operation amplifier 52, the inverted input of which is connected to the anode of the photo diode. The non-inverting input of the operation amplifier 52 and the cathode of the photo diode 55 are connected to ground. The drift integrator also includes an ohmic resistor 53 and a capacitor 54 connected in parallel. This parallel circuit forms a feedback loop from the output of the operation amplifier 52 to its inverting input. The signal generated by the drift integrator 51 is a low-frequency signal which capture the low-frequency components of the image of the modulated laser radiation 5. These low-frequency components are, as described above, characteristic for modulation errors due to unwanted temperature effects affecting the modulator 2. The low-frequency signal characteristic of these unwanted temperature effects is supplied to the control stage 56 via a connection 58 arranged between the output of the operation amplifier 52 and control stage 56. The control stage 56 further includes an input for receiving via a connection 59 a setpoint signal for a desired modulator temperature. An output of the control stage 56 is connected via a power amplifier 57 to the Peltier element 6. The control stage 56 produces a control signal with a predetermined value for the temperature to which the temperature of the modulator 2 is to be set by the Peltier element 6. The control signal is then transmitted to the Peltier element 6 via the connection 60.

The device described with reference to FIG. 8 can be used to stabilize the operating temperature of the modulator 2 in a simple and reliable manner, which eliminates or at least reduces modulation errors.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. Device for writing on an imaging material, which comprises
    a radiation source for generating electromagnetic radiation of such a wavelength that image information is written onto the imaging material using said wavelength;
    a waveguide integrated with a substrate material, the waveguide being adapted as a modulator for modulating the radiation produced by the radiation source;
    the modulator including an input for receiving a modulation signal with the image information;
    a compensator for compensating a modulation error which occurs when the radiation is modulated;
    a first capture means for capturing an image of modulated radiation emitted by the modulator;
    a generator receiving the captured image of the modulated radiation;
    the generator is designed such that the supplied image for establishing the modulation error is compared with a set-point information and subsequently a modulation error signal is generated that depends on the established modulation error; wherein the compensator compensates the modulation error with the supplied modulation error signal; and wherein the compensator includes an arrangement for receiving an image signal which contains the image information to be written on the imaging material; and the modulation signal for modulating the radiation is generated depending on the image signal and the modulation error signal.

2. The device according to claim 1, wherein the set-point information contains the image information to be written on the imaging material.

3. The device according to claim 1, wherein the device comprises an evaluation means for processing the modulated radiation with respect to its spectral composition.

4. The device according to claim 3, wherein the evaluation means is designed such as to process the image of the modulated radiation captured by the first capture means.

5. The device according to claim 3, wherein the evaluation means is integrated in the substrate material.

6. The device according to claim 3, wherein the generator is designed such as to generate the modulation error signal in dependence of the spectral composition of the modulated radiation.

7. The device according to claim 1, wherein the compensator comprises a temperature stabilizer for stabilizing the temperature of the modulator.

8. The device according to claim 7, wherein the temperature stabilizer includes an input for receiving a control signal which can be used to define a stabilization temperature for the modulator.

9. The device according to claim 8, wherein the control signal can be generated depending on the low-frequency components of the modulated radiation, the components were established by the evaluation means and indicate modulation errors which are caused by unwanted temperature effects affecting the modulator.

10. The device according to claim 7, wherein the device includes a sensor for determining the temperature of the modulator.

11. The device according to claim 1, wherein the control signal for the temperature stabilizer can be produced in dependence of the determined temperature.

12. The device according to claim 11, wherein the temperature stabilizer is a Peltier element.

13. The device according to claim 10, wherein the sensor is connected with the generator and the modulation error signal can be generated by the generator depending on the determined temperature of the modulator.

14. The device according to claim 1, wherein the device includes a second capture means for capturing an image of the un-modulated radiation.

15. The device according to claim 14, wherein the device includes a changing means for changing the radiation supplied to the modulator depending on the captured image of the un-modulated radiation.

16. The device according to claim 15, wherein the changing means includes a polarizor for adjusting the polarization of the radiation supplied to the modulator.

17. The device according to claim 14, wherein the compensator is constructed in such a way that the image of the un-modulated radiation captured by the second capture means can be supplied to the compensator and the modulation signal can be generated also in dependence of this image.

18. The device according to claim 14, wherein the at least one the first and the second capture means is coupled to the substrate material through an optical waveguide.

19. The device according to claim 14, wherein the wavelength of the radiation produced by the radiation source is located in the visible or infrared region of the spectrum.

20. The device according to claim 14, wherein the device comprises a color mixer for superimposing at least three radiation components, wherein a first radiation component is located in the red, a second radiation component in the green, and a third radiation component in the blue wavelength region of the visible spectrum.

21. The device according to claim 14, wherein the at least one of the first and the second capture means comprises a so-called Y-coupler integrated in the substrate material.

22. The device according to claim 14, wherein the at least one of the first and the second capture means comprises a mirror or a prism for coupling out a portion of the modulated radiation.

23. The device according to claim 1, wherein at least one of the first and a second capture means comprises a photo detector.

24. The device according to claim 1, wherein the at least one of the first and the second capture means comprises a beam splitter integrated in the substrate material.

25. The device according to claim 1, wherein the basic material of the substrate material is potassium titanyl phosphate, $KTiOPO_4$, KTP.

26. The device according to claim 1, wherein the modulator is a Mach-Zehnder interferometer.

27. A method for writing on an imaging material comprising the following steps:
   producing an electromagnetic radiation having such a wavelength that image information can be written on the imaging material with the electromagnetic radiation;
   modulating the radiation produced by the radiation source with a waveguide integrated in a substrate material, the waveguide being constructed as a modulator and receives a modulation signal containing the image information;
   compensating a modulation error which occurs when the radiation is modulated;
   capturing an image of the modulated radiation produced by the modulator;
   determining the modulation error by comparing the captured image of the modulated radiation with a set-point information, and generating a modulation error signal in dependence of the determined modulation error;
   compensating the modulation error using the modulation errors signal; and
   wherein the modulation signal for modulating the radiation is produced in dependence of an image signal containing the image information to be written on the imaging material and of the modulation error signal.

28. The method according to one of the claim 27, wherein the modulated radiation is evaluated with respect to the spectral composition.

29. The method according to claim 27, wherein the temperature of the modulator is stabilized.

30. The method according to claim 29, further comprising the step of defining a stabilization temperature for the modulator.

31. The method according to claim 30, wherein the stabilization temperature is generated in dependence ofthe low-frequency components ofthe modulated radiation which are determined by the evaluation means and indicate modulation errors which are caused by unwanted temperature effects during the modulation.

32. The method according to claim 27, further comprising the step of determining the temperature of the modulator.

33. The method according to claim 32, wherein the stabilization temperature is generated in dependence of the determined temperature.

34. The method according to claim 32, wherein the modulation signal is generated in dependence of the determined temperature of the modulator.

35. The method according to claim 27, further comprising the step of capturing an image of the un-modulated radiation.

36. The method according to claim 35, further comprising the step of adjusting the radiation supplied to the modulator in dependence of the image.

37. The method according to claim 36, further comprising the step of adjusting the polarization of the radiation supplied to the modulator.

38. The method according to claim 35, wherein the modulation signal is generated in dependence of the image of the un-modulated radiation.

* * * * *